US008860700B2

(12) United States Patent
Wen et al.

(10) Patent No.: US 8,860,700 B2

(45) Date of Patent: Oct. 14, 2014

(54) DRIVING CIRCUIT OF A LIQUID CRYSTAL DEVICE AND RELATED DRIVING METHOD

(75) Inventors: Chun-Kuei Wen, Hsin-Chu (TW); Shih-Chieh Kuo, Hsin-Chu (TW); Che-Hsien Chen, Hsin-Chu (TW)

(73) Assignee: Au Optronics Corp., Hsin-Chu (TW)

(*) Notice: Subject to any disclaimer, the term of this patent is extended or adjusted under 35 U.S.C. 154(b) by 560 days.

(21) Appl. No.: 13/024,312

(22) Filed: Feb. 9, 2011

(65) Prior Publication Data

US 2012/0062526 A1 Mar. 15, 2012

(30) Foreign Application Priority Data

Sep. 15, 2010 (TW) .............................. 99131201 A

(51) Int. Cl.
*G06F 3/038* (2013.01)
*G09G 3/36* (2006.01)

(52) U.S. Cl.
CPC ............ *G09G 3/3677* (2013.01); *G09G 3/3648* (2013.01); *G09G 2310/067* (2013.01); *G09G 2320/041* (2013.01)
USPC ............................................ 345/204; 345/87

(58) Field of Classification Search
USPC .......................................................... 345/204
See application file for complete search history.

(56) References Cited

U.S. PATENT DOCUMENTS

| | | | | |
|---|---|---|---|---|
| 4,902,107 | A * | 2/1990 | Tsuboyama et al. | 349/72 |
| 5,684,503 | A * | 11/1997 | Nomura et al. | 345/97 |
| 6,037,920 | A * | 3/2000 | Mizutome et al. | 345/87 |
| 6,115,021 | A * | 9/2000 | Nonomura et al. | 345/101 |
| 6,774,883 | B1 * | 8/2004 | Muhlemann | 345/101 |
| 6,930,667 | B1 * | 8/2005 | Iijima et al. | 345/101 |
| 7,825,889 | B2 * | 11/2010 | Kim et al. | 345/101 |
| 7,864,152 | B2 * | 1/2011 | Park et al. | 345/98 |
| 8,054,282 | B2 * | 11/2011 | Park et al. | 345/101 |
| 2003/0010894 | A1 * | 1/2003 | Yoshihara et al. | 250/208.1 |
| 2003/0103026 | A1 * | 6/2003 | Yamakawa et al. | 345/87 |
| 2003/0107546 | A1 * | 6/2003 | Ham | 345/101 |
| 2003/0132901 | A1 * | 7/2003 | Shimada | 345/87 |
| 2005/0041007 | A1 * | 2/2005 | Iijima | 345/101 |
| 2005/0179639 | A1 * | 8/2005 | Hsieh | 345/102 |
| 2005/0190171 | A1 * | 9/2005 | Jang et al. | 345/204 |
| 2005/0231453 | A1 * | 10/2005 | Park et al. | 345/87 |
| 2008/0061877 | A1 * | 3/2008 | Adut | 330/256 |
| 2010/0245333 | A1 * | 9/2010 | Hsu et al. | 345/213 |

FOREIGN PATENT DOCUMENTS

CN 101587700 A 11/2009

* cited by examiner

*Primary Examiner* — Amare Mengistu
*Assistant Examiner* — Sarvesh J Nadkarni
(74) *Attorney, Agent, or Firm* — WPAT, PC; Justin King

(57) ABSTRACT

A driving circuit of an LCD device and related driving method is provided. The driving circuit includes a thermal sensor and a power IC. The thermal sensor is configured to detect the operational temperature of the LCD device, thereby generating a corresponding thermal signal. The power IC is configured to provide a plurality of clock signals for driving a gate driver of the LCD device, and adjust the effective pulse widths of the plurality of clock signals according to the thermal signal.

5 Claims, 5 Drawing Sheets

DRIVING CIRCUIT OF A LIQUID CRYSTAL DEVICE AND RELATED DRIVING METHOD

BACKGROUND OF THE INVENTION

1. Field of the Invention

The present invention is related to a driving circuit of an LCD device and related driving method, and more particularly, to a driving circuit of an LCD device and related driving method which improves cold-start.

2. Description of the Prior Art

Liquid crystals display (LCD) devices, characterized in low radiation, small size and low power consumption, have gradually replaced traditional cathode ray tube (CRT) devices and been widely used in electronic products, such as notebook computers, personal digital assistants (PDAs), flat panel TVs, or mobile phones.

FIG. 1 is a diagram of a prior art LCD device 100, and FIG. 2 is a diagram of a prior art LCD device 200. The LCD devices 100 and 200 each include a liquid crystal display panel 110, a timing controller 120, a source driver 130, a gate driver 140, a plurality of data lines $DL_1$-$DL_m$, a plurality of gate lines $GL_1$-$GL_n$, and a pixel matrix. The pixel matrix includes a plurality of pixel units PX each having a thin film transistor switch TFT, a liquid crystal capacitor $C_{LC}$ and a storage capacitor $C_{ST}$, and respectively coupled to a corresponding data line, a corresponding gate line and a common voltage $V_{COM}$. The timing controller 130 may generate control signals and clock signals for operating the source driver 130 and the gate driver 140. Therefore, the source driver 110 may generate data driving signals $SD_1$-$SD_m$ corresponding to display images, and the gate driver 140 may generate the gate driving signals $SG_1$-$SG_n$ for turning on the TFT switches.

In the LCD driver 100 illustrated in FIG. 1, the gate driver 140 is an external driving circuit which outputs the gate driving signals $SG_1$-$SG_n$ using a plurality of gate driver integrated circuits (ICs) 142. In the LCD driver 200 illustrated in FIG. 2, the gate driver 140 and the pixel units PX are both fabricated on the LCD panel 110 using gate on array (GOA) technique. The gate driver 140 of the LCD driver 200 may thus output the gate driving signals $SG_1$-$SG_n$ using a plurality of shift register units $SR_1$-$SR_n$, thereby reducing the number of chips and signal lines.

Traditional gate ICs and GOA gate drivers both require shift register units and level shifters for signal enhancement. In traditional gate ICs, the shift register units and the level shifters are integrated into a single chip in a CMOS process. In GOA gate drivers, the shift register units are fabricated in a TFT process and the level shifters are integrated into a pulse width modulation integrated circuit (PWM IC). Since the conducting current $I_{ON}$ of a TFT switch is proportional to its gate voltage $V_{GH}$ and inversely proportional to its operational temperature, the turn-on speed of the TFT switch decreases as the environmental temperature drops. The difficulty of turning on the TFT switch in low-temperature environment is known as "cold-start". In the prior art, the gate voltage $V_{GH}$ of the TFT switch is increased for increasing the conducting current $I_{ON}$ in low-temperature environment, which may cause extra power consumption.

SUMMARY OF THE INVENTION

The present invention provides a driving circuit of an LCD device. The driving circuit includes a thermal sensor configured to detect an operational temperature of the LCD device and generate a corresponding thermal signal; and a power IC configured to provide a plurality of clock signals for driving a gate driver of the LCD device and adjust effective pulse widths of the plurality of clock signals according to the thermal signal.

The present invention further provides a driving method of an LCD device. The driving method includes driving the LCD device using a plurality of clock signals each having a first effective pulse width when an operational temperature of the LCD device does not exceed a predetermined value; and driving the LCD device using a plurality of clock signals each having a second effective pulse width smaller than the first effective pulse width when the operational temperature of the LCD device exceeds the predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
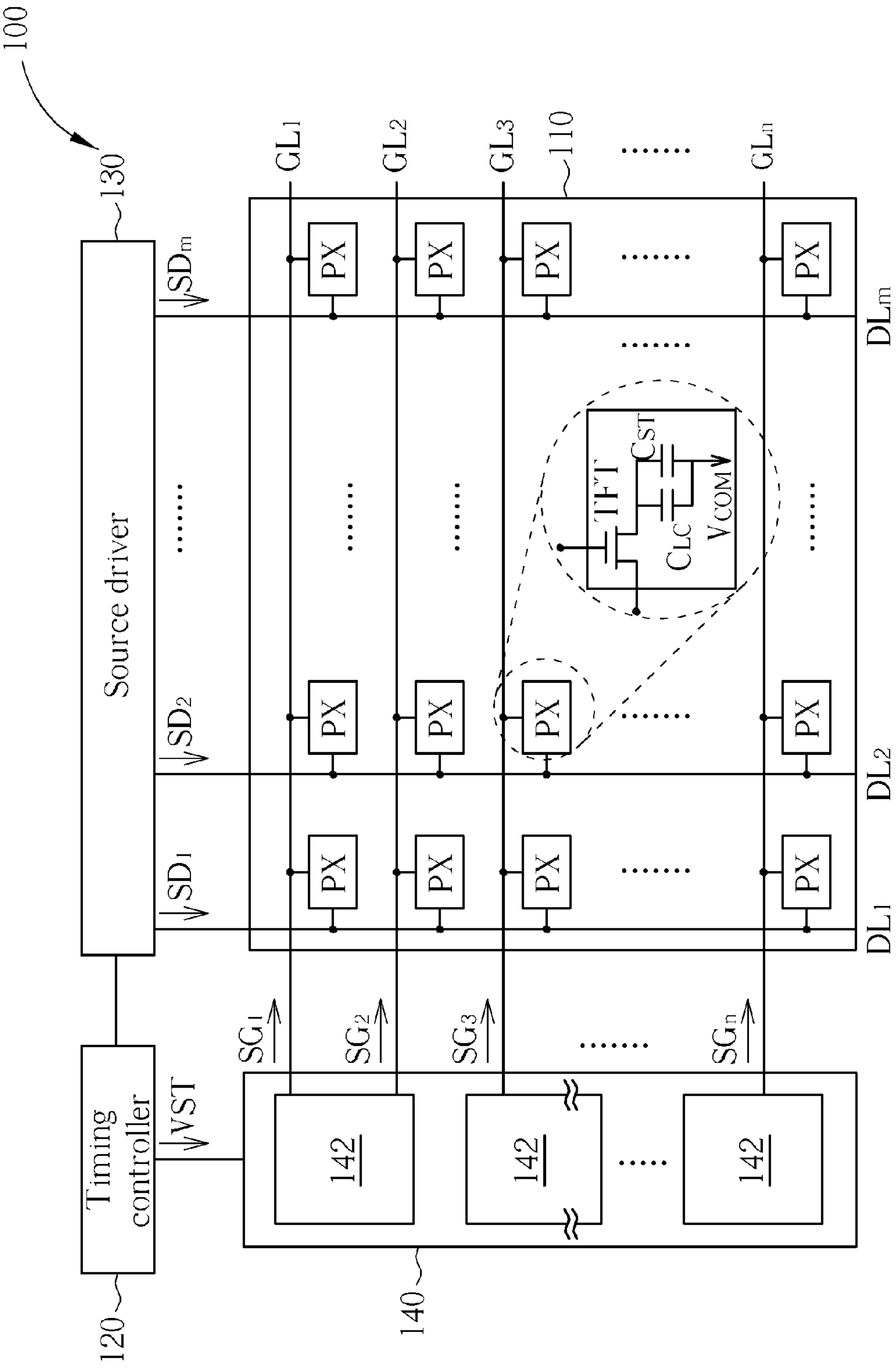
FIG. 1 PRIOR ART
FIG. 1 and FIG. 2 are diagrams of prior art LCD devices.
Figure 2:
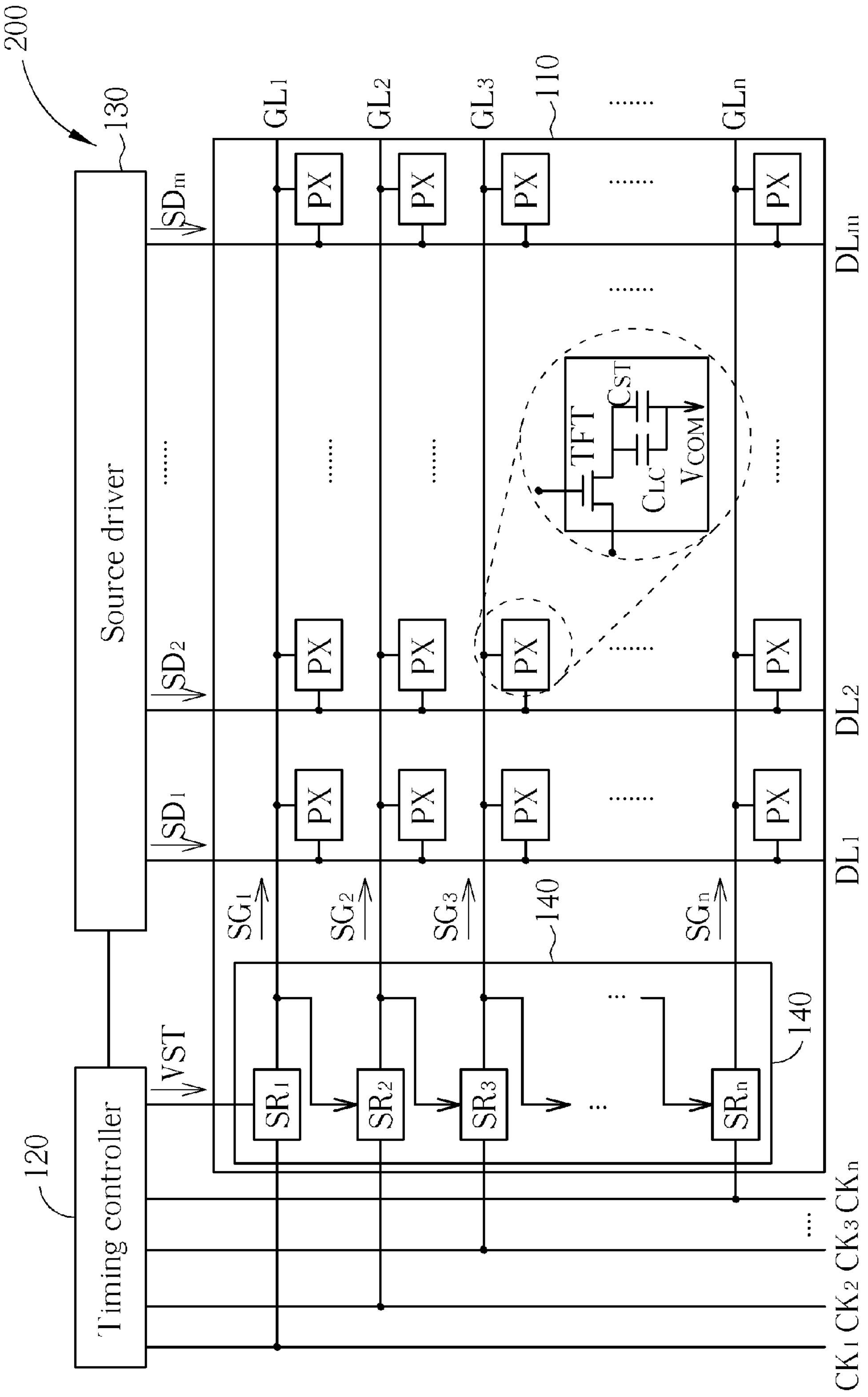
FIG. 2 PRIOR ART
Figure 3:
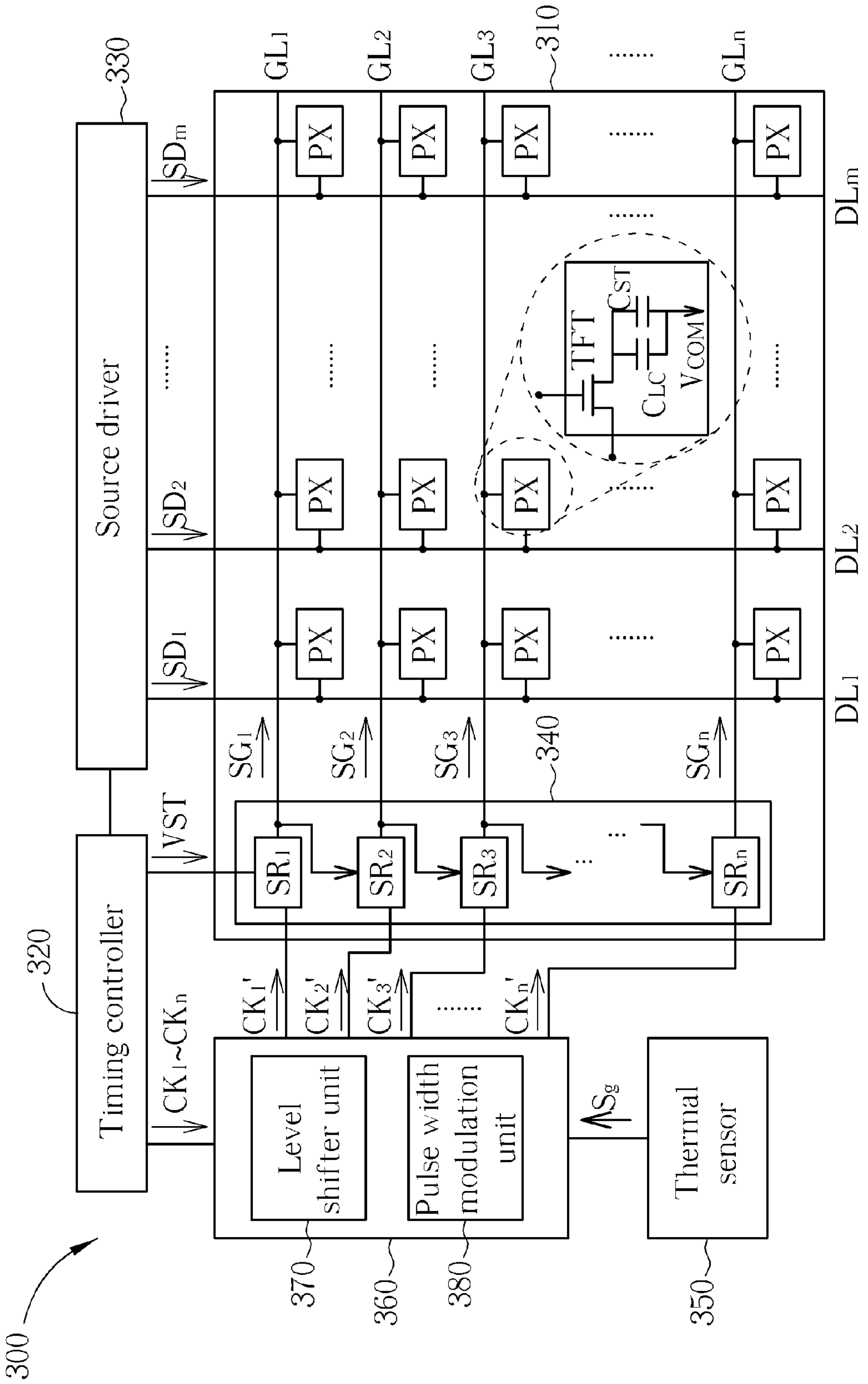
FIG. 3 is a diagram of an LCD device according to the present invention.

FIG. 3 is a diagram of an LCD device 300 according to the present invention. The LCD device 300 includes an LCD panel 310, a timing controller 320, a source driver 330, a gate driver 340, a thermal sensor 350, a power IC 360, a plurality of data lines $DL_1$-$DL_m$, a plurality of gate lines $GL_1$-$GL_n$, and a pixel matrix. The pixel matrix is disposed on the LCD panel 310 and includes a plurality of pixel units PX each having a thin film transistor switch TFT, a liquid crystal capacitor $C_{LC}$ and a storage capacitor $C_{ST}$, and respectively coupled to a corresponding data line, a corresponding gate line and a common voltage $V_{COM}$. The timing controller 320 is configured to generate a start pulse signal VST and reference clock signals $CK_1$-$CK_n$ for operating the source driver 330, the gate driver 340 and the power IC 360. Therefore, the source driver 330 may generate data driving signals $SD_1$-$SD_m$ corresponding to display images, and the power IC 360 may generate output clock signals $CK_1'$-$CK_n'$ for operating the gate driver 340. In the LCD device 300, the gate driver 340 and the pixel units PX are both fabricated on the LCD panel 310 using GOA technique. Therefore, according to the start pulse signal VST and the output clock signals $CK_1'$-$CK_n'$, the gate driver 340 may output the gate driving signals $SG_1$-$SG_n$ via a plurality of shift register units $SR_1$-$SR_n$ for turning on the thin film transistor switches TFT.

The thermal sensor 350 is configured to detect the operational temperature of the LCD device 300, thereby generating a corresponding thermal signal Sg. The power IC 360 includes a level shifter unit 370 and a pulse width modulation unit 380. The level shifter unit 370 is configured to raise the voltage levels of the reference clock signals $CK_1$-$CK_n$. The pulse width modulation unit 380 is configured to adjust the effective pulse widths of the reference clock signals $CK_1$-$CK_n$. Therefore, the voltage levels of the output clock signals $CK_1'$-$CK_n'$ generated by the power IC 360 are higher than those of the reference clock signals $CK_1$-$CK_n$, and the effective pulse widths of the output clock signals $CK_1'$-$CK_n'$ vary with temperature.

In the present invention, the reference clock signals $CK_1$-$CK_n$ alternatively switch between an enable level and a disable level with a predetermined frequency. The enable level refers to the voltage level required to turn on a TFT switch, and the effective pulse widths refer to the periods when the reference clock signals $CK_1$-$CK_n$ remain at the enable level. In other words, the present invention increases the turn-on time of the TFT switch when operating in low-temperature environment in order to compensate the decrease in the conducting current of the TFT switch with the temperature, thereby improving cold-start.

For example, assume that a cold-start threshold temperature for determining whether cold-start may be a concern is set to 25° C. When the thermal sensor 350 detects that the operational temperature of the LCD device 300 is higher than 25° C., the pulse width modulation unit 380 is configured to provide the output clock signals $CK_1$'-$CK_n$' having smaller effective pulse widths; when the thermal sensor 350 detects that the operational temperature of the LCD device 300 is lower than 25° C., the pulse width modulation unit 380 is configured to provide the output clock signals $CK_1$'-$CK_n$' having larger effective pulse widths so as to increase the driving ability of the gate driver 340. Meanwhile, according to the output clock signals $CK_1$'-$CK_n$', the gate driving signals $SG_1$-$SG_n$ respectively provided by the shift register units $SR_1$-$SR_n$ in low-temperature environment may have larger effective pulse widths so as to improve cold-start of the pixel units.

Figure 4:
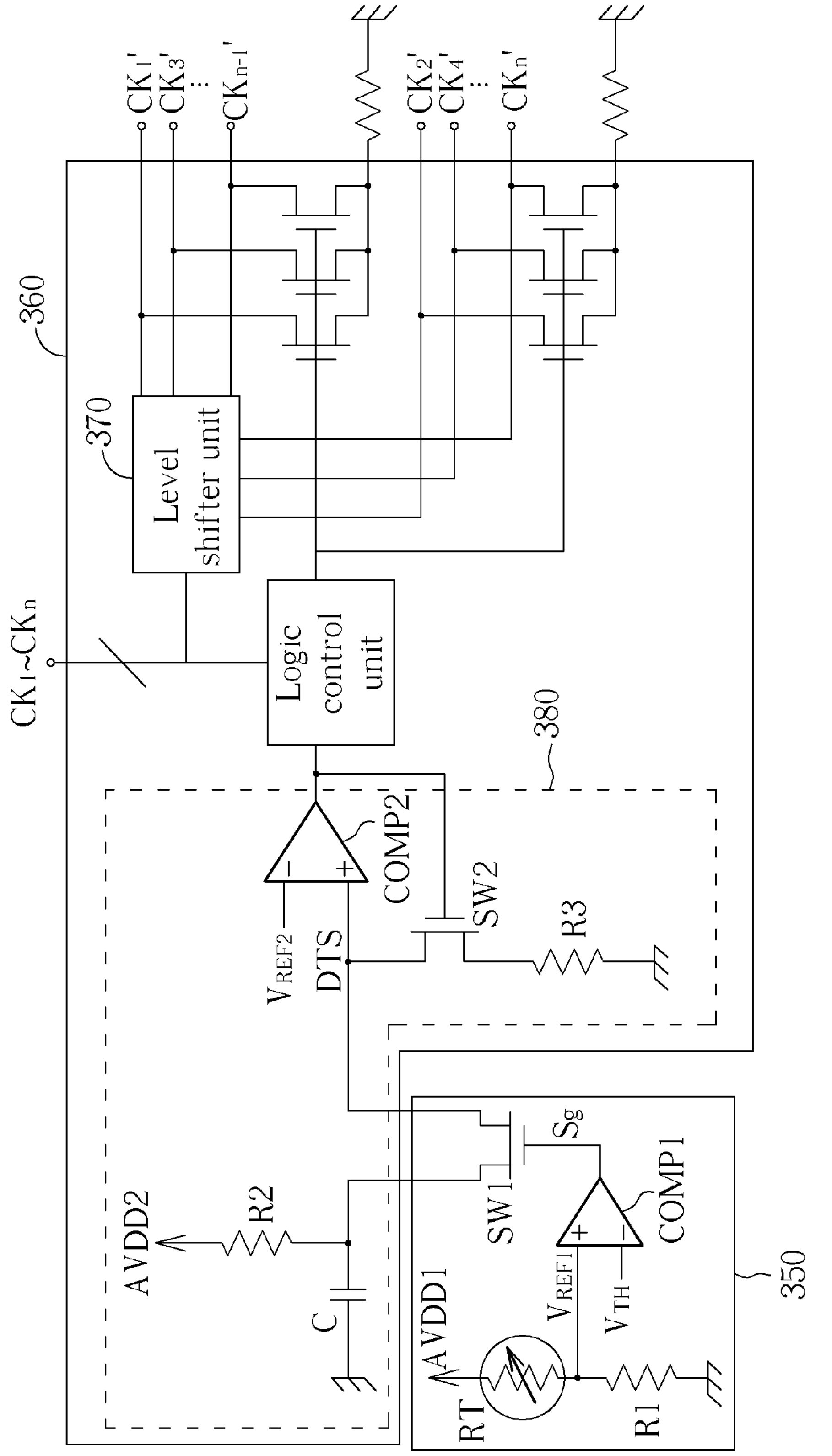
FIG. 4 is diagram illustrating an embodiment of a thermal sensor and a power IC according to the present invention.

The pulse width modulation unit 380 may adjust the effective pulse widths of the reference clock signals $CK_1$-$CK_n$ by means of voltage trimming according to the thermal signal Sg. For example, voltage trimming may be achieved by discharging the signal falling edges of the reference clock signals $CK_1$-$CK_n$. The effective pulse widths of the reference clock signals $CK_1$-$CK_n$ may thus be adjusted with different amount of voltage trimming, such as varying the start time, the amount, or the length of discharge. FIG. 4 is diagram illustrating an embodiment of the thermal sensor 350 and the power IC 360 according to the present invention. The thermal sensor 350 includes a resistor R1 a thermal resistor RT, a comparator COMP1, and a switch SW1. The thermal resistor RT is a variable resistor whose resistance varies with temperature. The resistor R1, the thermal resistor RT and a voltage source AVDD1 constituting a voltage-dividing circuit may provide a reference voltage $V_{REF1}$ associated with the operational temperature of the LCD device 300. The reference voltage $V_{REF1}$ is supplied to the positive input terminal of the comparator COMP1, and a voltage $V_{TH}$ associated with the cold-start threshold temperature (such as 25° C.) is supplied to the negative input terminal of the comparator COMP1. The switch SW1 may be a metal-oxide-semiconductor transistor switch. In normal-temperature environment ($V_{REF1}>V_{TH}$), the comparator COMP1 is configured to output the thermal signal Sg at the enable level for turning on the switch SW1; in low-temperature environment ($V_{REF1}<V_{TH}$), the comparator COMP1 is configured to output the thermal signal Sg at the disable level for turning off the switch SW1.

In the embodiment illustrated in FIG. 4, the pulse width modulation unit 380 may perform voltage trimming and includes a capacitor C, resistors R2 and R3, a comparator COMP2, and a switch SW2. When the switch SW1 is turned off, a voltage source AVDD2 may charge the capacitor C via the resistor R2. When the switch SW1 is turned on, the energy stored in the capacitor C may be transferred to a node DTS and then discharged via the resistor R3 when the voltage level of the node DTS (the positive input terminal of the comparator COMP2) exceeds that of the reference voltage $V_{REF2}$ (the negative input terminal of the comparator COMP2), thereby achieving voltage trimming at the signal falling edges of the reference clock signals $CK_1$-$CK_n$. When the voltage level of the node DTS does not exceed that of the reference voltage $V_{REF2}$, the switch SW2 is turned off and voltage trimming is stopped. The values of the capacitor C and the resistor R2 determine the slope of voltage trimming (the slope of the signal falling edges), and the values of the reference voltage $V_{REF2}$ and the capacitor C determine the length of voltage trimming. The charge time $T_{CHARGE}$ and the discharge time $T_{DISCHARGE}$ of the capacitor C may be represented as follows:

$$T_{CHARGE} = -R2 \times C \times \ln\left(\frac{AVDD2 - V_{REF2}}{AVDD2 \times \frac{R2}{R2+R3}}\right)$$

$$T_{DISCHARGE} = -R3 \times C \times \ln\left(\frac{AVDD2 \times \frac{R3}{R2+R3}}{V_{REF2}}\right)$$

Figure 5B:
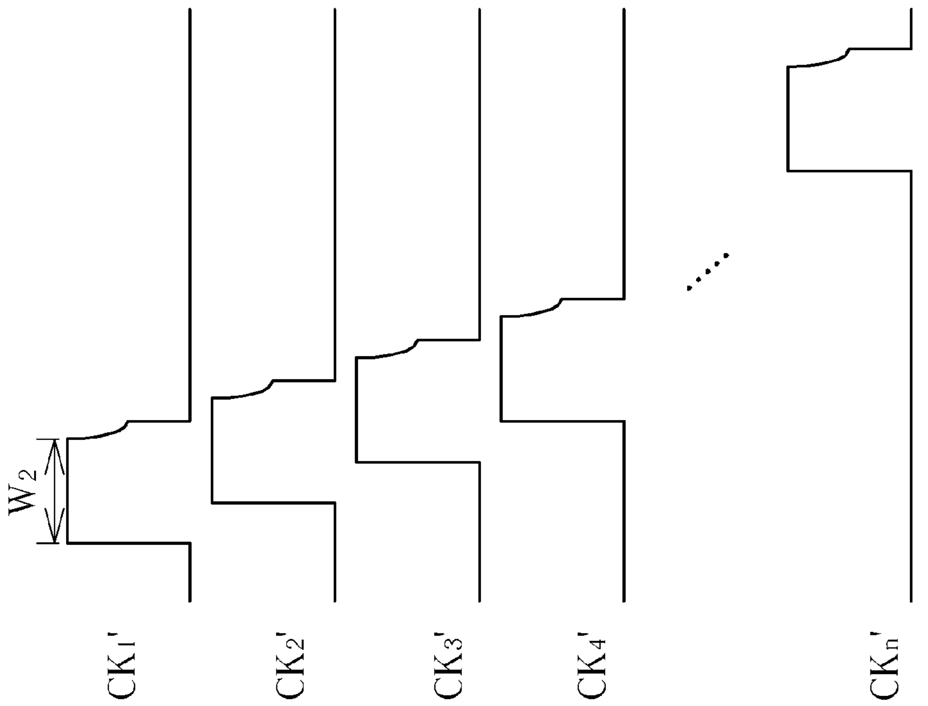
FIGS. 5A and 5B are diagrams illustrating driving methods of the LCD device according to the present invention.
Figure 5A:
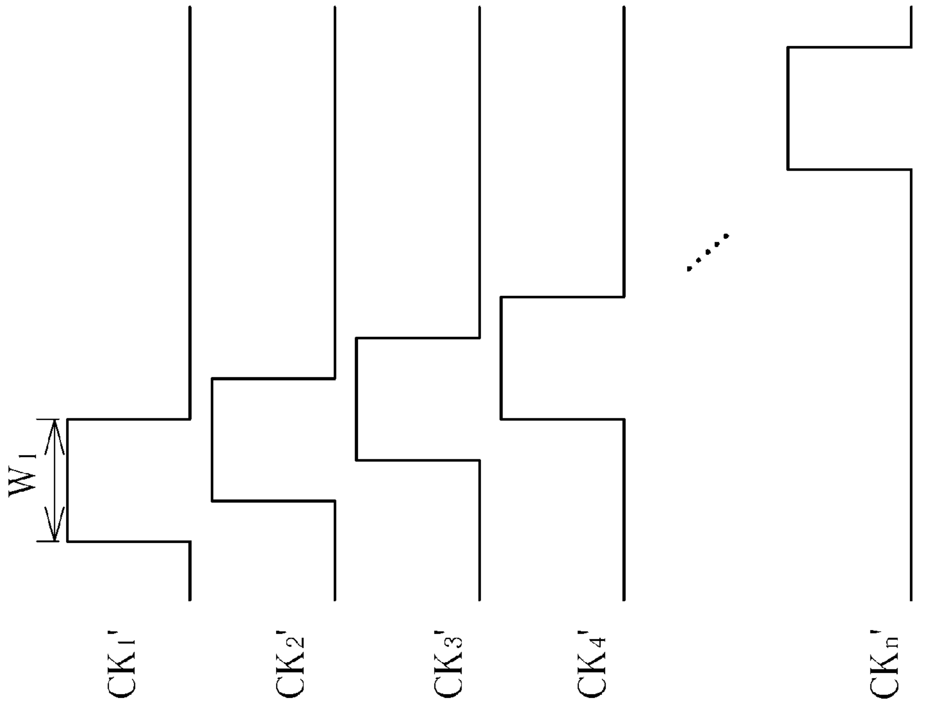

FIGS. 5A and 5B are diagrams illustrating driving methods of the LCD device according to the present invention. FIG. 5A depicts the output clock signals $CK_1$'-$CK_n$' provided in low-temperature environment (such as below 25° C.), and FIG. 5B depicts the output clock signals $CK_1$-$CK_n$' provided in normal-temperature environment (such as above 25° C.). With the pulse width modulation unit 380, the effective pulse width W1 of the output clock signals $CK_1$'-$CK_n$' provided in low-temperature environment is larger than the effective pulse width W2 of the output clock signals $CK_1$'-$CK_n$' provided in normal-temperature environment, thereby increasing the turn-on time of the TFT switches in low-temperature environment, as depicted in FIGS. 5A and 5B.

According to the thermal signal Sg associated with the operational temperature of the LCD device, the pulse width modulation unit 380 of the present invention may adjust the effective pulse widths of the reference clock signals $CK_1$-$CK_n$ in many ways, such as shortening the effective pulse widths of the reference clock signals $CK_1$-$CK_n$ by voltage trimming. However, FIG. 4 only illustrates an embodiment of the present invention and does not limit the scope of the present invention.

In low-temperature embodiment, the present invention scans the TFT switches with signals having larger effective pulse widths which may increase the turn-on time of the TFT switches when operating in low-temperature environment in order to compensate the decrease in the conducting current of the TFT switches with the temperature, thereby improving cold-start.

Those skilled in the art will readily observe that numerous modifications and alterations of the device and method may be made while retaining the teachings of the invention.

What is claimed is:

1. A driving circuit of a liquid crystal display (LCD) device comprising:

a source driver configured to output data driving signals to corresponding pixel units of the LCD device according to a plurality of first clock signals;

a gate driver configured to selectively turn on corresponding pixel units of the LCD device according to a plurality of second clock signals;

a thermal sensor configured to detect an operational temperature of the LCD device and generate a corresponding thermal signal; and a power integrated circuit (IC) configured to provide the plurality of second clock signals for driving the gate driver of the LCD device and adjust effective pulse widths of the plurality of second clock signals according to the thermal signal;

wherein when the operational temperature of the LCD device does not exceed a predetermined value, the power IC is configured to provide the plurality of second clock signals each having a first effective pulse width; or when the operational temperature of the LCD device exceeds the predetermined value, the power IC is configured to perform Voltage trimming by discharging signal falling edges of the plurality of second clock signals, thereby providing the plurality of second clock signals each having a second effective pulse width smaller than the first effective pulse width.

2. A driving circuit of a liquid crystal display (LCD) device comprising:

a source driver configured to output data driving signals to corresponding pixel units of the LCD device according to a plurality of first clock signals;

a gate driver configured to selectively turn on corresponding pixel units of the LCD device according to a plurality of second clock signals;

a thermal sensor configured to detect an operational temperature of the LCD device and generate a corresponding thermal signal; and a power integrated circuit (IC) configured to provide the plurality of second clock signals for driving the gate driver of the LCD device and adjust effective pulse widths of the plurality of second clock signals according to the thermal signal, comprising a level shifter unit configured to raise voltage levels of the plurality of second clock signals; and a pulse width modulation unit configured to perform voltage trimming on the plurality of second clock signals according to the thermal signal, thereby adjusting the effective pulse widths of the plurality of second clock signals.

3. The driving circuit of claim 2 wherein the pulse width modulation unit comprises a resistor-capacitor circuit configured to provide a discharging path via which the power IC performs voltage trimming at the signal falling edges of the plurality of second clock signals.

4. A driving method of an LCD device comprising:

providing data driving signals to corresponding pixel units of the LCD device according to a plurality of first clock signals;

selectively turning on corresponding pixel units of the LCD device according to a plurality of second clock signals;

adjusting effective pulse widths of the plurality of second clock signals according to an operational temperature of the LCD device, and reducing effective pulse widths of the plurality of second clock signals by performing voltage trimming on the plurality of second clock signals when the operational temperature of the LCD device exceeds the predetermined value.

5. The driving method of claim 4 further comprising:

adjusting a slope or a length based on which voltage trimming is performed on the plurality of second clock signals according to the operational temperature of the LCD device.

* * * * *